United States Patent [19]

in'tVeld

[11] 4,051,038

[45] * Sept. 27, 1977

[54] FLOW CONTROL VANE FOR A SKIMMER-TYPE OIL BOOM

[75] Inventor: Cornelis in'tVeld, Vlaardingen, Netherlands

[73] Assignee: National Marine Service, Inc., St. Louis, Mo.

[*] Notice: The portion of the term of this patent subsequent to Sept. 7, 1993, has been disclaimed.

[21] Appl. No.: 643,170

[22] Filed: Dec. 22, 1975

Related U.S. Application Data

[63] Continuation-in-part of Ser. No. 527,293, Nov. 26, 1974, abandoned.

[30] Foreign Application Priority Data

Nov. 26, 1973 Netherlands ............... 7316165

[51] Int. Cl.² ............................................. E02B 15/04
[52] U.S. Cl. ............................ 210/242 S; 210/DIG. 25
[58] Field of Search .................. 210/83, 242, DIG. 25; 61/1 F

[56] References Cited

U.S. PATENT DOCUMENTS

| | | | |
|---|---|---|---|
| 3,630,376 | 12/1971 | Price | 210/242 |
| 3,664,505 | 5/1972 | Brittingham | 210/242 |
| 3,789,988 | 2/1974 | Valibouse et al. | 210/242 |
| 3,890,234 | 6/1975 | Galilia | 210/242 |
| 3,909,417 | 9/1975 | Rafael | 210/242 |
| 3,928,206 | 12/1975 | Waren | 210/242 |
| 3,979,291 | 9/1976 | in't Veld | 210/242 X |

FOREIGN PATENT DOCUMENTS

| | | |
|---|---|---|
| 1,634,066 | 7/1971 | Germany |
| 1,634,186 | 8/1971 | Germany |
| 1,324,433 | 7/1973 | United Kingdom |

*Primary Examiner* — Theodore A. Granger
*Attorney, Agent, or Firm* — Bacon & Thomas

[57] ABSTRACT

A flow control vane in a moving current of water causes lowering of the surface of water rearwardly of the vane. The vane is placed transversely across the front of a surface skimmer in an oil boom apparatus used to collect and remove floating oil from a body of water moving relatively towards the skimmer. The vane causes a stable pool of water to form behind it, the pool having a surface level lower than surrounding water, and improves operation of the skimmer. The vane is an upright and inclined web element having a forwardly curved upper leading edge and a rearwardly curved lower trailing edge.

4 Claims, 8 Drawing Figures

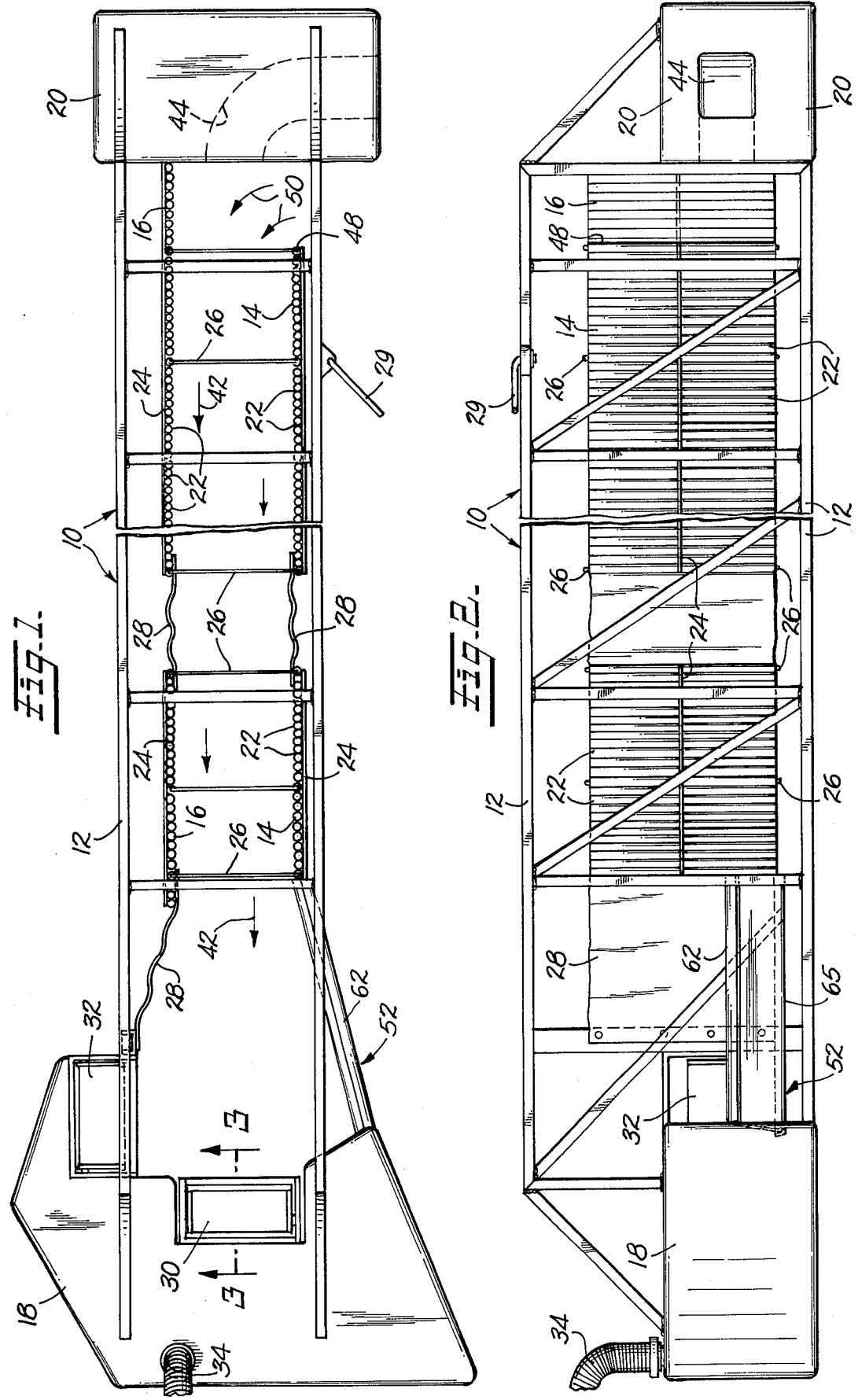

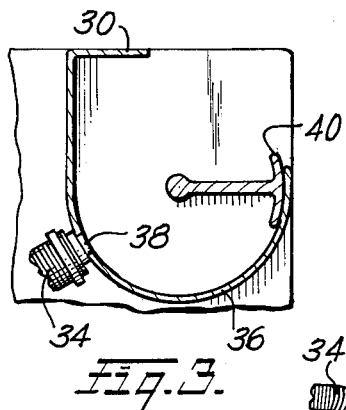
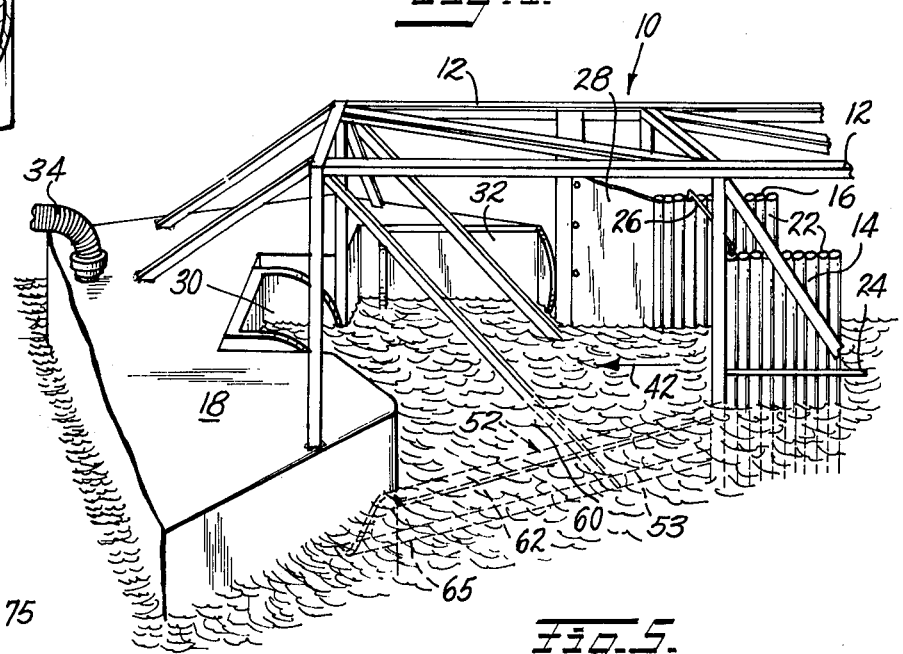
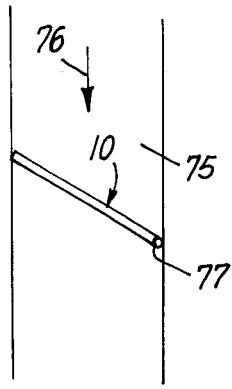
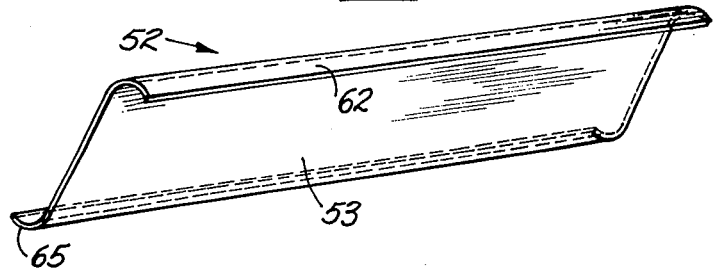
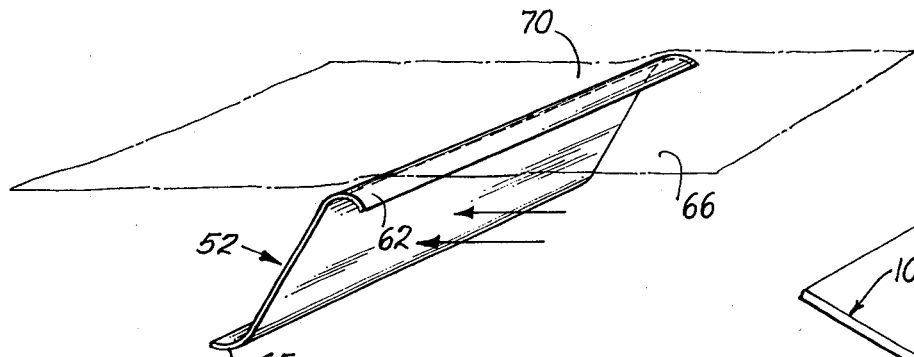
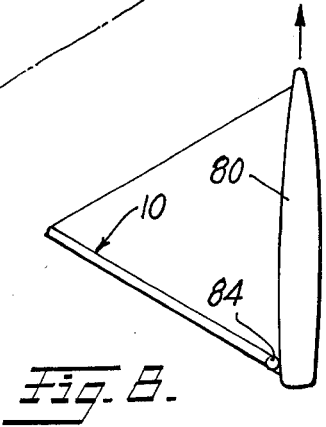

FLOW CONTROL VANE FOR A SKIMMER-TYPE OIL BOOM

CROSS-REFERENCE TO OTHER APPLICATIONS

This is a continuation-in-part of U.S. application Ser. No. 527,293, filed Nov. 26, 1974, now abandoned.

BACKGROUND OF THE INVENTION

Skimmer-type oil booms are well known in the prior art, wherein a floating boom assembly is towed across the surface of a body of water having a floating oil slick thereon, and some means are provided to gather the oil in a central area for removal by suction or mechanical devices. Various floating boom structures of this type can be seen in such recent prior art patents as U.S. Pat. Nos. 3,688,506; 3,686,870 and 3,771,662, to name just a few examples.

The present invention, however, has particular application in connection with an oil boom as described in applicant's copending application Ser. No. 582,271, filed March, 1975, now U.S. Pat. No. 3,979,291, entitled "Oil Boom," that application being a continuation of Ser. No. 422,603, filed Dec. 6, 1973, now abandoned. (The latter application was co-pending with the parent case of the present application).

In applicant's co-pending oil boom application, a pair of boom segments are in the form of parallel, flexible barrier walls that float on the surface of the water, the barriers being supported upright by a rigid framework to which the walls are further connected by means of resilient connecting elements.

The oil boom is towed in a direction transverse to the lengths of the barrier walls, and surface oil and other floating contamination is deflected by the barriers towards surface skimmers located at one end of the oil boom assembly. The skimmers are floating weir units and also are subjected to oncoming surface current flow as the boom is towed across the water surface.

It has been discovered that under certain conditions of operation, the flow of water approaching a surface skimmer of the floating weir type will stand up in front of the skimmer unit somewhat in the manner of a bow wave on a vessel, and may prevent efficient removal of floating oil from the water's surface unless a deeper skimming action is taken to eliminate the effect of the standing wave in front of the skimmer. This may occur when the boom is towed or in a stationary installation where a river current is used to carry the oil to the skimmer and where the current of the river is relatively rapid.

It has therefore become apparent to the inventor that a means for controlling the level of surface water directly in front of the skimmer unit would alleviate the difficulty observed and would enhance the operation of the floating surface skimmer unit. It has also been observed that it is desirable to stabilize the area of water immediately in front of the skimmer by a suitable means.

BRIEF SUMMARY OF THE INVENTION

The present invention is based on the discovery that a floating weir suction-type oil skimmer operates more efficiently if the level of the water surface directly in front of the skimmer is relatively stable, particularly when the skimmer is subject to an oncoming surface current having appreciable velocity.

The invention comprises a flow control vane element comprising an elongated web member inclined in a forward direction with respect to an oncoming surface current, with the top edge of the web located slightly below the surface of the water. The orientation of the vane is such that the surface of the water itself is substantially undisturbed as the current moves over and around the vane, while a layer of the surface current just below the surface of the water is deflected downwardly beneath the vane, with the net result that the suction and eddy current effect behind the vane causes the surface of the water rearwardly of the vane to be lowered with respect to the surrounding surface of the water. Thus, if the vane is placed in an oil boom just forwardly of the skimmer units and the oil boom is towed in such a manner that oncoming surface current is deflected in the manner outlined above, the water level immediately in front of the skimmers is lowered and stabilized with respect to the surrounding water. The skimmers are therefore able to operate in a more efficient manner without the necessity to remove more than a thin surface layer of the water.

The flow control vane of the present invention is particularly useful in connection with a skimmer of the floating weir type wherein a buoyant lip section floats just below the surface of water to allow a thin surface layer to overflow the lip into a sump from which the liquid is continuously removed by suction. With such a skimmer, the oil floating on the surface of the water can be removed with a minimum of underlying water being removed and processed in a separator unit.

The flow control vane element is also useful in connection with an oil boom using parallel barriers for diverting the floating oil to a skimmer located between the planes of the barriers at one end of the boom. A boom of this type is described in applicant's application Ser. No. 582,271, now U.S. Pat. No. 3,979,291 referenced above. An oil boom constructed in accordance with applicant's teaching utilizes a surface transport current induced between the barriers to sweep oil that underpasses the forward barrier to the skimmer before it can underpass the rear barrier. Utilization of the flow control vane with an oil boom of this type causes a lowering of the surface level of the water at the end of the boom where the vane is situated to assist in the inducement of the flow of surface transport current towards this end of the boom and towards the skimmer.

The flow control vane itself comprises an elongated web element generally oriented in the water during its operation so that its longitudinal axis is generally parallel to the water's surface, with one side of the web facing the oncoming current in a forwardly inclined position. The upper edge of the web is bent forwardly to form a leading edge relative to the flow stream and the lower edge of the web is bent rearwardly to form a trailing edge, with both the leading and trailing edge areas being curved back slightly towards the central part of the web. Preferably, the top and lower edges of the web are smoothly curved areas.

DETAILED DESCRIPTION OF THE INVENTION

Referring to the appended drawings,

FIG. 1 is a plan view of an oil boom incorporating the flow control vane of the present invention;

FIG. 2 is an elevational view of FIG. 1;

FIG. 3 is a partial sectional view of one of the skimmers of the oil boom and is a view taken along line 3—3 of FIG. 1;

FIG. 4 is an enlarged view of one end of the oil boom showing the barriers, skimmers and the flow control vane;

FIG. 5 shows a preferred form of flow control vane;

FIG. 6 shows the vane in its operational position and illustrates the principle involved; and FIGS. 7 and 8 schematically show the different applications of the oil boom incorporating the flow control vane.

With reference to the drawings, particularly FIG. 1, an oil boom assembly 10 includes a framework 12 supporting a pair of vertical barriers 14, 16, the details of which do not per se constitute the subject matter of the present invention. End floats 18, 20 provide buoyancy for the boom and the barriers themselves may be made individually buoyant by constructing them of buoyant tubular elements 22 (FIG. 4) held together by flexible lines 24 and braced by brace members 26. Flexible webs 28 prevent surface flow around the various barrier sections and form flexible joints permitting the barrier sections to flex vertically to follow wave action when the boom is on the surface of a large body of water. The boom can be fixed to the shore of a river or towed alongside a vessel such as by a cable 29 (FIG. 1).

Surface skimmers 30, 32, which appear in cross-section as shown in FIG. 3, are provided at one end of the boom and are mounted on one of the end floats 18 at right angles to each other in this example. While two skimmers are illustrated, one skimmer may be sufficient to remove oil from the surface of the water, depending on the efficiency and capacity of the skimmer. A suction hose 34 is connected to the sump 36 of the skimmer. In FIG. 3, the details of the skimmer 30 are shown and such details are typical of both skimmers. A sump 36 has an outlet 38 and a buoyant inlet lip 40. The lip 40 is conterbalanced in a suitable manner so that it normally floats just beneath the surface of the water at a depth just exceeding the thickness of floating oil in the water, so that the surface of the water is skimmed in a manner generally known per se.

The oil boom 10 is towed across a floating oil slick in a direction generally transversely of its length so that the forward barrier 14 will deflect floating oil towards the skimmers. The oil boom may be towed at a slight angular inclination with respect to its direction of movement to enhance the deflecting action. Any oil underpassing the front barrier 14 will immediately surface between the front and rear barriers 14 and 16. A surface transport current generally indicated by arrows 42 is induced between the barriers 14 and 16 running towards the skimmers. Such current is induced during towing by deflector duct 44 in float 20 and possibly by the bypassing of oncoming surface current around shorter end 48 of forward barrier 14 as shown by arrows 50. The barrier 16, of course, is extended up to the float 20 (FIG. 1) to close off any flow around barrier 16 at its right end as viewed in FIG. 1. The left end of boom 10 is closed by the skimmers 18, 32 and the float 18, as well as by web 28, so that surface water presented to the skimmers comes from around the end of front barrier 14 (the surface bypass area) and from between the barriers via the surface current 42.

A flow control vane 52 (FIGS. 4–6) diagonally extends between float 18 and adjacent end 54 of barrier 14. The top edge of the vane 52 lies just below the surface of water on which the boom floats, so that oncoming water is diverted under the vane in a specific manner, while the surface layer with the floating oil thereon is relativey undisturbed. Oncoming flow deflected under the vane creates an eddy current type depression of surface water level behind the vane relative to the current flow so that a depressed and stable level of water is maintained in front of the skimmers and behind the vane as the boom is towed in a transverse direction across its length. The floating inlet lips 40 of of skimmers can therefore function at the edge of a relatively stable and depressed pool of surface water generally indicated by area 60 in FIG. 4. As an added benefit, depressed pool 60 also enhances the surface transport current 42 between the barriers 14, 16 by providing a pool of lower surface level into which the transport current of higher surface level can flow.

The vane 52, as seen in FIGS. 5 and 6 preferably is an imperforate metal web oriented in the water during towing of the boom generally as shown in FIG. 6. The vane includes an elongated central body 53 constituting a web section oriented so that its longitudinal axis is disposed generally parallel to the surface of the water in which it is immersed. The vane includes an upper edge area 62 bent forwardly in a horizontal sense and curved around somewhat back towards the central web 53 so that edge area 62 forms a leading edge area of the vane when it is immersed in a moving current of water indicated by arrows 64. The bottom edge 65 of the vane is curved rearwardly also in a horizontal sense and slightly back towards the central web 52 to form a trailing edge area of the vane. The central web 53 is inclined forwardly when the vane is in operative position. In such position, the level of the surface of the oncoming water is generally indicated by line 61 in FIG. 6, and such surface level is slightly above the top (about 20cm) of the vane 52, with the leading edge area 62 of the vane meeting the oncoming surface layer 68 of water with a minimum of interference. Below the surface layer, however, vane 52, which is inclined forwardly, causes oncoming water to be deflected downwardly beneath the web to create a depression behind the vane which is maintained for some distance behind the web. This depression assumes the form of a stable pool having a surface level 70 slightly below the surface level 66 of surrounding water. The pool surface 70 is stable up to the skimmers 30, 32, free from the water build-up effect that would otherwise be experienced if the skimmers were subjected directly to oncoming surface current. Such build-up, of course, would require the skimmers to be set for a "deeper" cut of surface water to overcome such a condition if it were desired to efficiently gather floating oil into the skimmers by the overflow of the surface oil over a floating weir.

Actually, the depressed pool 60 is observed to form a stable gathering place for floating oil deflected by the forward barrier 14 and also oil carried to this area by the surface transport current 42, and from which place the skimmers can efficiently remove the oil with a minimum of surface water.

An additional benefit and advantage of the use of the flow control vane 52 occurs when it is used with a double barrier oil boom as shown in FIG. 4. When an oil boom of this construction is towed transversely of its length across a body of water, there is a build-up of water on the forward side of the leading vertical area wall 14 and a lowering of the water level immediately behind the forward wall due to the eddy current effect.

If a flow control vane is not utilized in the manner illustrated in FIG. 4, there is a tendency for the water level flowing around the end of the forward barrier 14 to build-up until it reaches a level that may be higher than the water level immediately behind the forward barrier 14. This is undesirable, since the operation of this type of oil boom depends on the inducement of a surface transport current flowing from the far end of the boom towards the skimmers for its proper operation, as outlined above. The provision of the flow control vane 52 causes a lowering of the surface of the pool 60 so that it more closely approximates and even is lower than the surface level of the water immediately rearwardly of the forward barrier 14. The surface transport current is thus enhanced and improved up to the skimmers 30, 32.

FIG. 7 shows an example of how boom 10 can be oriented in a moving river or stream, which is generally indicated by 75, with the oncoming current indicated by 76. The boom 10 would be extended angularly across the river 75, with the skimmer located at 77. The vane 52 would be located just upstream of the skimmer. In FIG. 8, the boom 10 is shown disposed in the manner in which it would be towed by a vessel 80 utilizing tow lines schematically represented by 82. Skimmers would be located at 84 in this embodiment, with vane 52 just forward of the skimmer.

The vane 52 preferably is supported so as to be fully adjustable about vertical and horizontal axes so that its position and orientation can be precisely adjusted relative to the boom structure and relative to the oncoming stream.

It should be understood that various other embodiments of the present invention are envisioned and that the embodiment described herein is exemplary of the invention as defined in the claims that follow.

I claim:

1. In an oil boom including a pair of longitudinally extending and generally parallel surface barriers constituting a forward and rear barrier and a longitudinally extending surface space therebetween, the forward barrier being shorter than the rear barrier at one end, and an end closure for the said space at said one end being connected to the rear barrier and extending forwardly so as to define a surface bypass area between said end closure and the adjacent end of said forward barrier, the improvement comprising a fixed flow control vane extending generally longitudinally of said forward barrier and between said forward barrier and said end closure, said vane including an upright, relatively narrow and elongated central web section extending longitudinally of the vane, the web section being forwardly inclined and disposed so as to lie beneath the surface of a body of water in which the boom is afloat by a predetermined distance.

2. The invention recited in claim 1, further wherein, as part of the improvement, the oil boom includes a surface skimmer located rearwardly with respect to the flow control vane, and having an inlet which is in communication with said surface space between the barriers.

3. The invention recited in claim 1, further wherein said vane includes a fowardly and generally horizontally extending leading edge area connected to the upper portion of the web section.

4. The invention recited in claim 3, further wherein said vane includes a rearwardly and generally horizontally extending trailing edge area connected to the lower part of said web section.

* * * * *